Aug. 19, 1952  C. W. LARSON  2,607,444
MAGNETIC BRAKE FOR TREMOLOS
Filed Aug. 1, 1950  2 SHEETS—SHEET 1
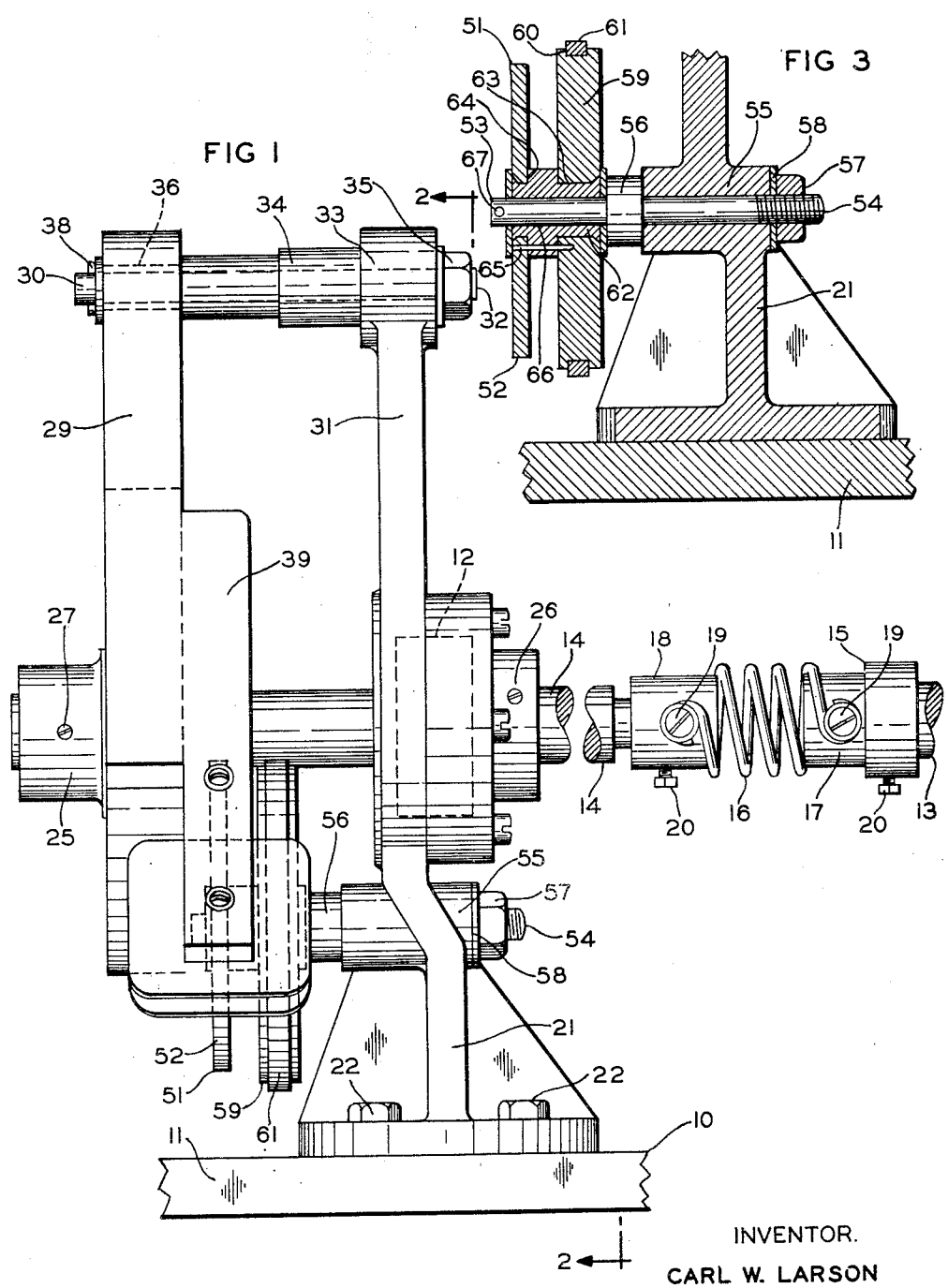
INVENTOR.
CARL W. LARSON
BY
Caswell & Lagaard
ATTORNEYS

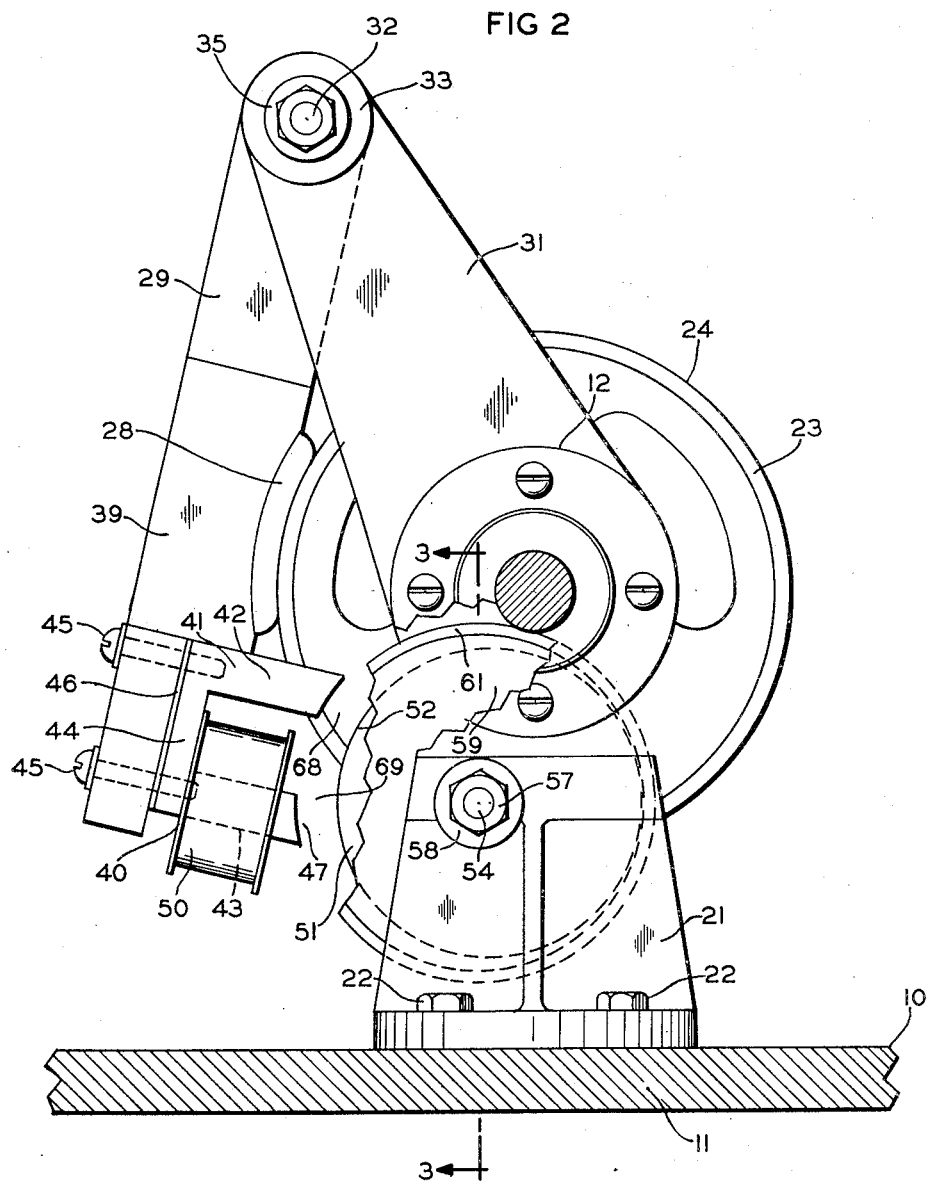

Patented Aug. 19, 1952

2,607,444

UNITED STATES PATENT OFFICE 2,607,444

MAGNETIC BRAKE FOR TREMOLOS

Carl W. Larson, Minneapolis, Minn., assignor to Patent Management, Incorporated, Minneapolis, Minn., a corporation of Minnesota Application August 1, 1950, Serial No. 176,944

7 Claims. (Cl. 188—161)

The herein disclosed invention relates to tremolos for electric organs and particularly to an organ having a driving element and a driven element driven thereby and operating a number of tone generators and has for an object to provide a flexible coupling between said driving element and driven element and magnetically controlled means for periodically varying the speed of said driven element.

Another object of the invention resides in providing retarding means for reducing the speed of the driven element and utilizing magnetic means for operating the retarding means.

A still further object of the invention resides in providing the driven element with a brake member and in mounting a brake shoe for movement toward and from the brake member and in providing a magnet for movement with the brake shoe and cooperating with a conductor of magnetic flux movable with the driven element and forming with the magnet an air gap adapted to vary in length upon movement of said conductor.

Another object of the invention resides in constructing the conductor in the form of a rotatable circular disc eccentrically disposed with reference to axis of rotation thereof and forming with the magnet during rotation an air gap of constantly varying length.

Other objects of the invention reside in the novel combination and arrangement of parts and in the details of construction hereinafter illustrated and/or described.

In the drawings:

Fig. 1 is a side elevational view of a portion of an electric organ illustrating an embodiment of the invention applied thereto.

Fig. 2 is a cross sectional view taken on line 2—2 of Fig. 1.

Fig. 3 is an elevational fragmentary sectional view taken on line 3—3 of Fig. 2.

The structure shown in the drawings consists of a support having bearings for rotatably supporting a driving shaft and a driven shaft. A flexible coupling is connected between these shafts. The driven shaft has mounted on it a brake drum which is adapted to be engaged by a brake shoe mounted on a swinging arm. This arm carries an electro-magnet having a U-shaped core formed with arcuate pole pieces. A conductor of magnetic flux in the form of a disc is eccentrically mounted on a countershaft driven by said driven shaft. The edge of this disc passes said pole surfaces and forms therewith two air gaps, the combined length of which varies as the countershaft is rotated. By such rotation the magnetic force of attraction between the magnet and disc varies with the result that the pressure on the shoe varies to vary the speed of the driven shaft and produce a tremolo effect in the tones produced by the generators.

For the purpose of illustrating the invention a portion of an electric organ 10 has been shown which comprises a base 11. Mounted on this base are a number of aligned bearings, one of which is indicated by the reference numeral 12. These bearings support a driving shaft 13 and a driven shaft 14. The driving shaft 13 is driven by an electric motor preferably of the constant speed type which has not been shown in the drawings. Between the two shafts 13 and 14 is a flexible coupling 15 which consists of a helical spring 16 secured at its ends to two hubs 17 and 18 by means of screws 19 screwed into said hubs. The hubs 17 and 18 are mounted on the two shafts 13 and 14 and secured thereto by means of set screws 20. By means of this construction the speed of the shaft 14 may be periodically varied while the shaft 13 rotates at a constant speed. The bearing 12 is mounted on a standard 21 which is secured to the support or base 11 by means of screws 22. The shaft 14 is held from endwise movement in its bearing by means of collars which are attached thereto and engage said bearings. The collar engaging the bearing 12 is indicated by the reference numeral 26. Shaft 14 drives a number of tone generators not shown in the drawings and by varying the speed of the shaft a tremolo effect is given to the tones produced thereby.

The retarding means of the invention includes a brake drum 23 which has a cylindrical braking surface 24. This brake drum has a hub 25 bored to fit on the shaft 14. A set screw 27 holds the brake drum fast on said shaft. Cooperating with the brake drum 23 is a brake shoe 28 which is attached to a swinging arm 29. Arm 29 is mounted for swinging movement on a stud 30 secured to a bracket 31 issuing upwardly from the standard 21. This stud has a threaded shank 32 which extends through a boss 33 on the bracket 31. A collar 34 formed integral with the stud 30 engages the boss 33 on one side thereof while a nut 35 screwed on the end of the shank 32 holds the stud attached to said bracket. The stud 30 extends through a bushing 36 disposed in the arm 29. A spacer 37 spaces the arm 29 from the collar 34 while a cotter pin 38 maintains the arm on the stud. The axis of the stud 30 is parallel to the axis of the shaft 14 so that as the arm 29 swings brake shoe 28 is moved toward and from the surface 24 of brake drum 23.

Mounted on an offset 39 on the arm 29 is an electromagnet 40. This magnet comprises a core 41 consisting of two spaced legs 42 and 43 with a yoke 44 therebetween. This core is attached to the offset 39 by means of screws 45 which extend through said offset and are screwed into the core 41. The ends of the legs 43 and 44 form pole pieces which terminate in pole surfaces 47 and 48. These surfaces lie in an arc of a circle. Shims of different sizes such as illustrated at 46 may be placed between the core 41 and offset 39 and serve to vary the relation between the core 41 and the shoe 28. A coil 50 on the leg 43 of core 41 is energized by any suitable source of electrical energy which serves to magnetize the same.

Associated with the magnet 40 is a conductor 51 of magnetic flux. This conductor is constructed of iron or steel and is in the form of a disc or drum having a cylindrical surface 52. The said conductor is mounted for rotation of a stud 53 as best shown in Fig. 3. This stud has a shank 54 which extends through a boss 55 formed on the standard 21. A collar 56 integral with said stud engages boss 55 on one side thereof while a nut 57 screwed on the outer end of the shank 54 and engaging a washer 58 clamps the stud in position on said standard. The stud 53 rotatably supports a driven wheel 59. This wheel has a groove 60 in the same in which is received a rubber tire 61. The said tire engages the surface of shaft 14 and is driven thereby. The wheel 59 and the conductor 51 are mounted on a bushing 62 which is formed with annular rabbets 63 and 64 in which said wheel and conductor are received. The ends of said bushing are riveted over to hold the parts assembled while a pin 65 prevents relative rotation therebetween. The bushing 62 has a bore 66 in the same which receives the stud 53. A cotter pin 67 passes through the stud 53 and holds the assembly in place on the stud 53. The disc 51 travels so that its surface 52 passes the pole faces 47 and 48. This surface forms with said pole faces two air gaps 68 and 69. The conductor 51 is eccentrically mounted on the bushing 62 so that as the said conductor rotates the air gaps 68 and 69 vary in length, and correspondingly the magnetic attraction between the magnet 40 and conductor 51 varies. This varies the pressure of the shoe 28 on the surface 24 of the drum 23 which, in turn, varies the speed of the shaft 14. In this manner a tremolo effect is procured.

The method of operation of the invention is evident. Shoe 28 normally rides freely on the surface 24 of brake 23 without perceptibly affecting the speed of shaft 14 and the pitches of the tone generators. When the coil 50 is energized magnetic attraction results between the magnet 40 and the conductor 51 which produces a pull between the two, varying in magnitude depending on the distance between the surfaces 47 and 48 of the core 41 of said magnet and the surface 52 of conductor 51. This in turn varies the pressure of the brake shoe 28 on the surface 24 of brake drum 23. Thus the pull between the magnet 40 and conductor 51 causes periodic retardation of the speed of the shaft 14 which drives the tone generators. Such action gives to the tones a tremolo effect. The percent modulation produced can be varied by using shims of different thickness in place of the shim 46 shown.

The advantages of the invention are manifest. The device is simple in construction and practical and positive in operation. The device is extremely quiet and produces a tremolo which remains constant in both frequency and amplitude. The device uses very little power.

Having described the invention what is claimed as new and desired to be protected by Letters Patent is set forth in the following claims:

1. In a tremolo a supporting structure, a rotatable driving element and a rotatable driven element supported thereby, a flexible coupling continuously acting between said elements, a brake member on said driven element a movable support, a brake shoe cooperating with said brake member and carried by said support guide means acting between said support and supporting structure and guiding said shoe for movement toward and from said brake member, a magnet carried by support and having a pole, a conductor of magnetic flux, pivot means acting between said conductor and supporting structure and guiding said conductor for rotation, means for driving said conductor from said driven element, said conductor having parts moving past the pole of the magnet, certain of said parts being disposed more remotely from the axis of rotation of said conductor than others, said magnet acting on said conductor to draw said shoe against said brake member, the degree of pressure therebetween varying with the disposition of said parts relative to said pole.

2. In a tremolo a supporting structure, a rotatable driving element and a rotatable driven element supported thereby, a flexible coupling continuously acting between said elements, a brake member on said driven element, a movable support, a brake shoe cooperating with said brake member and carried by said support guide means acting between said support and supporting structure and guiding said shoe for movement toward and from said brake member, a magnet carried by said support and having a pole, a circular conductor of magnetic flux, pivot means acting between said conductor and supporting structure and guiding said conductor for rotation, means for driving said conductor from said driven element, said conductor having the circular portion of the same movable past the pole, said circular member being eccentrically disposed with reference to said pole and forming therewith an air gap the length of which varies upon rotation of said driven element to vary the degree of pressure between said brake member and said brake shoe.

3. In a tremolo a rotatable driving element and a rotatable driven element, a flexible coupling continuously acting between said elements, retarding means for varying the relative speed between said driven element and said driving element and acting on said driven element and magnetic means operated by one of said rotatable elements and actuating said retarding means.

4. In a tremolo a supporting structure a rotatable driving element and a rotatable driven element supported thereby, a flexible coupling continuously acting between said elements, retarding means carried by said supporting structure and acting on said driven element to vary the relative speed between said driven element and said driving element, said retarding means having a movable part, a magnet having a pole, a conductor of magnetic flux rotatable with said driven element and having parts moving past the pole of the magnet, certain of said parts being disposed more remotely from the axis of rotation of said conductor than others, supporting means for supporting said magnet for movement toward and from said conductor, said magnet acting on said conductor to draw said magnet toward said conductor, said magnet operating the movable part of said retarding means.

5. In a tremolo a supporting structure, a rotatable driving element and a rotatable driven element supported thereby, a flexible coupling continuously acting between said elements, a brake member on said driven element a movable support, a brake shoe cooperating with said brake member and carried by said support guide means acting between said support and supporting structure and guiding said shoe for movement toward and from said brake member, a magnet carried by said support and having a core U-shaped in form provided with legs terminating in spaced poles, a winding on said core, a conductor of magnetic flux pivot means acting between said conductor and supporting structure and guiding said conductor for rotation, means for driving said conductor from said driven element and having a surface moving past said poles and forming an air gap therewith said magnet urging said brake shoe into engagement with said brake member, parts of said surface being disposed at different distances from the center of the axis of rotation of said conductor to vary the lengths of said air gaps as the driven member rotates to vary the force exerted by said magnet and correspondingly the pressure between said brake shoe and brake member.

6. In a tremolo a supporting structure, a rotatable driving element and a rotatable driven element supported thereby, a flexible coupling continuously acting between said elements, a brake member on said driven element a movable support, a brake shoe cooperating with said brake member and carried by said support guide means acting between said support and supporting structure and guiding said shoe for movement toward and from said brake member, a magnet carried by said support and having a core U-shaped in form provided with legs terminating in spaced poles, a winding on said core, a conductor of magnetic flux pivot means acting between said conductor and supporting structure and guiding said conductor for rotation, means for driving said conductor from said driven element and having a portion movable past said poles to form air gaps therebetween said magnet urging said brake shoe into engagement with said brake member, said portion throughout its extent varying in distance from said poles to vary the combined length of said air gaps as the driven member rotates to vary the force exerted by said magnet and correspondingly the pressure between said brake shoe and brake member.

7. In a tremolo a supporting structure a rotatable driving element, a rotatable driven element supported thereby, a flexible coupling continuously acting between said elements, a brake drum connected to and rotatable with said driven element, a brake shoe for engagement therewith, an arm, a brake shoe carried thereby, pivot means acting between said supporting structure and arm and guiding said shoe for movement toward and from said drum, a magnet carried by said arm and having a U-shaped core formed with spaced legs terminating in poles having arcuate pole faces, a conductor of magnetic flux having a circular surface pivot means acting between said conductor and supporting structure and supporting said conductor for rotation about an axis eccentric with respect to the center of said surface, said surface being movable past said pole faces and forming therewith two air gaps said magnet urging said brake shoe against said brake drum, said air gaps varying in combined length to vary the force of magnetic attraction between said conductor and magnet and correspondingly the pressure between said brake shoe and brake drum.

CARL W. LARSON.

REFERENCES CITED

The following references are of record in the file of this patent:

UNITED STATES PATENTS

| Number | Name | Date |
|---|---|---|
| 1,185,839 | Sears | June 6, 1916 |
| 1,956,350 | Hammond | Apr. 24, 1934 |
| 2,460,868 | Appel | Feb. 8, 1949 |